United States Patent
Bappe et al.

(10) Patent No.: US 8,621,121 B1
(45) Date of Patent: Dec. 31, 2013

(54) DETECTING BOGUS IOS IN A MULTIPATHING DRIVER

(71) Applicant: EMC Corporation, Hopkinton, MA (US)

(72) Inventors: Michael E. Bappe, Loveland, CO (US); Vinay G. Rao, Bangalore (IN); Ronald Chambers, Fort Collins, CO (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/627,594

(22) Filed: Sep. 26, 2012

(51) Int. Cl.
*G06F 13/00* (2006.01)
*G06F 3/00* (2006.01)

(52) U.S. Cl.
USPC ............ 710/38; 710/2; 710/5; 710/8; 710/11; 710/32

(58) Field of Classification Search
None
See application file for complete search history.

(56) References Cited

U.S. PATENT DOCUMENTS

| 7,757,128 B1 | 7/2010 | Aiello et al. | |
|---|---|---|---|
| 2011/0202738 A1* | 8/2011 | Hiraiwa et al. | 711/162 |

OTHER PUBLICATIONS

Raizen et al., "Techniques Involving Flaky Path Detection," U.S. Appl. No. 13/339,669, filed Dec. 29, 2011.

* cited by examiner

*Primary Examiner* — Scott Sun
(74) *Attorney, Agent, or Firm* — BainwoodHuang (57) ABSTRACT

An improved technique for processing IO requests has been described that distinguishes bogus IOs from genuine IO request failures by accessing a hardware configuration record that associates available paths with hardware components at different hardware layers traversed by the paths. When an IO request fails down a first path, a second path is selected for retrying the IO request by accessing the hardware configuration record and identifying a path that the record indicates traverses hardware components that are different from those traversed by the first path at multiple hardware layers. The chance that an IO request will fail due to faulty hardware over both the first path and the second path is thus low, such that IO failures down both the first path and the second path provide a clear indication that the IO request is bogus.

20 Claims, 4 Drawing Sheets

| Path ID | Host Bus | HBA | Host Port | SAN Port In | SAN Port Out | Array Port | Array FE | Array Bus |
|---|---|---|---|---|---|---|---|---|
| 1 | 1 | 1 | 1 | 1 | 1 | 1 | 1 | 1 |
| 2 | 1 | 1 | 2 | 2 | 1 | 1 | 1 | 1 |
| 3 | 1 | 2 | 3 | 3 | 1 | 1 | 1 | 1 |
| 4 | 1 | 2 | 4 | 4 | 1 | 1 | 1 | 1 |
| 5 | 2 | 3 | 5 | 5 | 1 | 1 | 1 | 1 |
| 6 | 2 | 3 | 6 | 6 | 1 | 1 | 1 | 1 |
| 7 | 2 | 4 | 7 | 7 | 1 | 1 | 1 | 1 |
| 8 | 2 | 4 | 8 | 8 | 1 | 1 | 1 | 1 |
| 9 | 1 | 1 | 1 | 2 | 1 | 1 | 1 | 1 |
| ⋮ | | | | | | | | |
| 64 | 2 | 4 | 8 | 8 | 8 | 8 | 4 | 2 |

FIG. 4

DETECTING BOGUS IOS IN A MULTIPATHING DRIVER

BACKGROUND

Multipathing (MP) drivers are commonly used in host computing systems ("hosts") to read data from and write data to storage arrays via multiple paths. In a typical arrangement, a host runs an application program on behalf of a user. The host is connected to a storage array, either directly, via a computer network, and/or via a storage area network (SAN). In typical operation, the application program issues IO requests. The IO requests designate data to be written to or read from the array; they may also designate activities to be performed on the array (e.g., control IOs). Within the host, each IO request is passed to an MP driver, which selects a path for transmitting the IO request to the array. In general, many such paths are provided, and it is a role of the MP driver to select a path for each IO request. Multiple paths are provided between the host and the array to provide redundancy, allow load sharing, and enable failover. A popular example of an MP driver is the PowerPath® driver from EMC Corporation of Hopkinton, Mass.

IO requests sometimes fail to complete. For example, a loose or disconnected cable can interrupt a selected path, preventing an IO request from reaching the array. Other errors can also cause IO requests to fail, such as faulty hardware. In response to an IO request failure, the MP driver typically retries the IO request down a different path.

Some IO requests fail even in the absence of any problem with the selected path. These IO requests, sometimes referred to as "bogus IOs," fail no matter which path is selected. Examples of bogus IOs include requests to write to write-protected media, requests to read or write media that are not ready to respond to read or write requests, and IO requests directed to damaged media. Bogus IOs fail even when the paths between the host and the array are working perfectly.

SUMMARY

Typically, the MP driver has no way of detecting, a priori, whether the failure of an IO request is genuine or bogus. The MP driver thus responds to a bogus IO the same way it responds to any failing IO request, by retrying the IO request down a different path. With bogus IOs, however, IO requests do not succeed down any path, so the MP driver typically retries the failing IO request down all available paths. Only when all available paths have been tried does the MP driver stop trying to find a working path. The MP driver then fails the IO request, and the application program that originated the IO request responds to the failure in accordance with its programming.

It has been recognized that bogus IOs are typically rare; however, their occurrences can cause long delays that happen at unpredictable times. In some implementations, each time an IO request fails, a connection test is performed. The connection test sends a message down the selected path to a computer or other processing device on the array. A successful exchange of messages can confirm connectivity; however, such exchange does not rule out an intermittent connection. Some implementations perform connection tests each time an IO request fails. For bogus IOs, the time required to perform connection tests on literally all available paths can result in a severe burden to the host and the array, and can impair efficient operation of running application.

In contrast with the conventional approach for processing failing IO requests, an improved technique distinguishes bogus IOs from genuine IO request failures by accessing a hardware configuration record that associates available paths with hardware components at different hardware layers traversed by the paths. When an IO request fails down a first path, a second path is selected for retrying the IO request by accessing the hardware configuration record and identifying a path that the record indicates traverses hardware components that are different from those traversed by the first path at multiple hardware layers. The hardware traversed by the second path is thus distinct at multiple layers from the hardware traversed by the first path. Ideally (but not necessarily) the hardware components will be distinct at every hardware layer for which different hardware components are provided. The chance that an IO request will fail due to faulty hardware over both the first path and the second path is thus low, such that IO failures down both the first path and the second path provide a clear indication that the IO is bogus. With the improved technique, it is not necessary to try every path, or typically even greater than two paths, before concluding that an IO request is bogus. Consistently efficient performance of the host, the array, and the application program is thus improved.

Certain embodiments are directed to a method of processing IO requests. The method includes dispatching an IO request over a first path between a multipathing driver on a host and a storage volume on an array and receiving a first indication from the array that the IO request over the first path failed. The method further includes accessing a hardware configuration record that associates each of multiple paths between the driver and the storage volume, including the first path, with a hardware component in each of multiple hardware layers traversed by the paths. A second path is identified for retrying the IO request based on the hardware configuration record indicating that the hardware components for the second path are different across multiple hardware layers from the hardware components for the first path in the respective hardware layers. The method still further includes retrying the IO request over the second path and identifying the IO request as bogus in response to receiving a second indication from the array that the IO request using the second path failed.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for processing IO requests distinguishes bogus IOs from genuine IO request failures by accessing a hardware configuration record that associates available paths with hardware components at different hardware layers traversed by the paths. When an IO request fails down a first path, a second path is selected for retrying the IO request by accessing the hardware configuration record and identifying a path that the record indicates traverses hardware components that are different from those traversed by the first path at multiple hardware layers. IO failures down both the first path and the second path provide a clear indication that the IO request is bogus.

Figure 1:
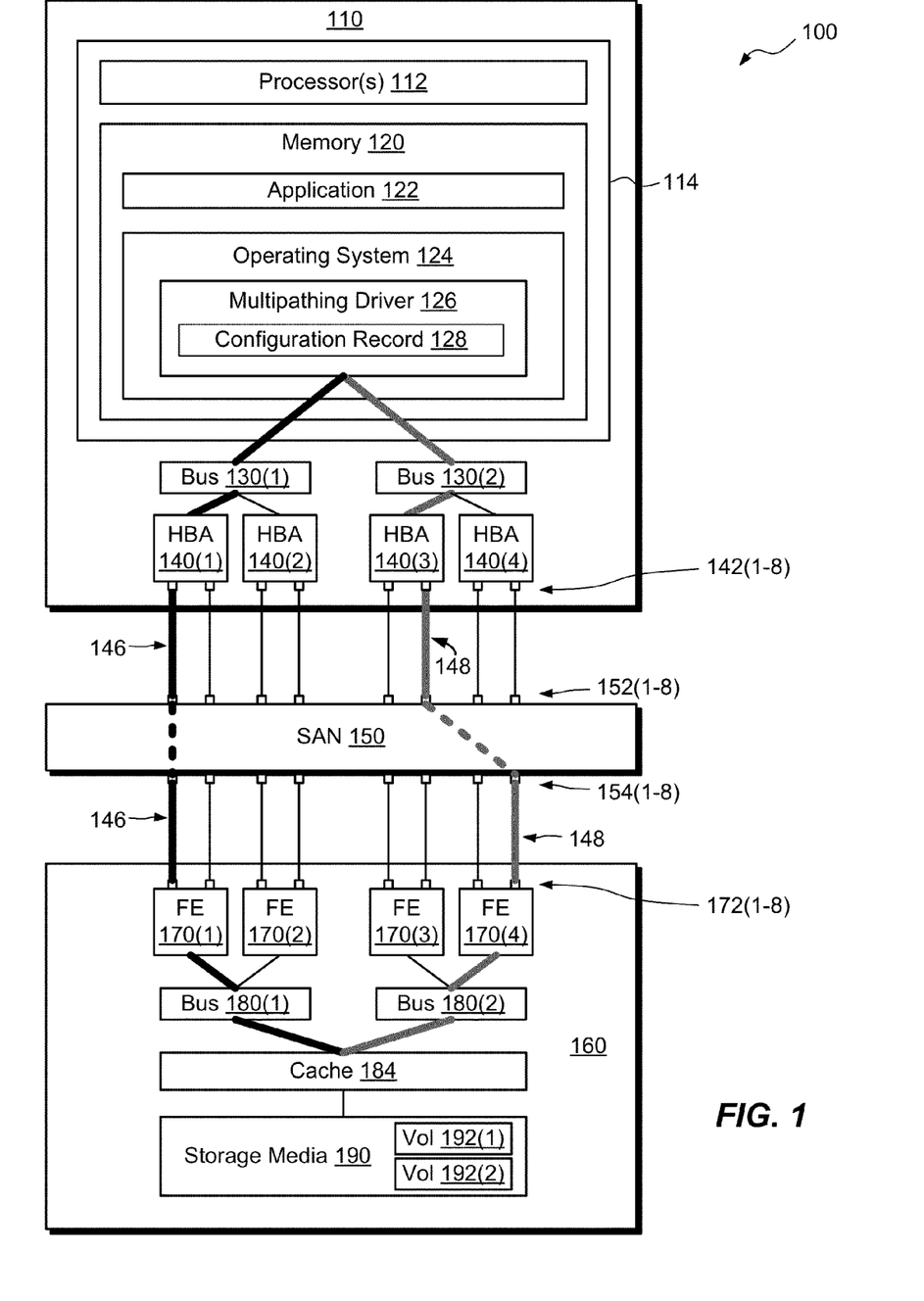
FIG. 1 is a block diagram of an example electronic system in which a host computing device is connected to a storage array via multiple paths.

FIG. 1 shows an example electronic system 100 in which improved techniques for processing IOs can be practiced. As shown, the electronic system 100 includes a host computing device (i.e., a "host") 110, a storage area network (SAN) 150, and a storage array 160.

The host 110 includes a set of processors 112 (i.e., one or more processing chips and/or assemblies), memory 120, first and second host buses 130(1) and 130(2), and first through fourth host bus adapters (HBAs) 140(1)-140(4). The set of processors 112 and the memory 120 together form a controller 114 for carrying out various processes described herein. Each HBA has multiple ports, and a total of eight HBA ports, 142(1)-142(8), are shown (two for each of the HBAs 140(1)-140(4)). It is understood that HBAs may be provided that include greater or fewer than two ports each, and that different HBAs may include different numbers of ports.

In an example, the host buses 130(1) and 130(2) are Peripheral Component Interconnect (PCI) buses, extended PCI buses (PCI-X), PCI Express buses, other types of buses, or a combination of buses of different bus types. Although only two host buses 130(1) and 130(2) are shown, it is understood that the host 110 can include any number of host buses. The HBAs 140(1)-140(4) are typically provided in the form of circuit board assemblies that plug into the respective buses (e.g., HBAs 140(1)-140(2) plug into host bus 130(1), and HBAs 140(3)-140(4) plug into host bus 130(2)). Although four HBAs 140(1)-140(4) are shown, it is understood that a greater or lesser number of HBAs may be provided.

The memory 120 typically stores digital information for realizing an application program 122 and an operating system 124. The memory 120 may store a myriad of software constructs; however, only a few of them appear in the figure for the sake of simplicity. In the example shown, the operating system 124 includes a multipathing (MP) driver 126. The MP driver 126 includes a configuration record 128. Alternatively, the configuration record 128 is disposed outside the MP driver 126 and in communication with the MP driver 126. As will become evident from the ensuing description, the configuration record 128 stores a record of hardware components traversed by different paths at different hardware layers of the electronic system 100.

As further shown in the example illustrated, the SAN 150 has eight input ports 152(1)-152(8) and eight output ports 154(1)-154(8). The SAN 150 is configured for flexible switching, such that each input port 152(1)-152(8) can be connected to each output port 154(1)-154(8). Typically, however, the SAN 150 connects each of the input ports 152(1)-152(8) to only a single one of the output ports 154(1)-154(8) at a time. In the arrangement shown, each of the ports 142(1)-142(8) on the host 110 is connected, e.g., using cabling, to a respective one of the input ports 152(1)-152(8) on the SAN 150. Also, each of the output ports 154(1)-154(8) of the SAN 150 is connected, e.g., using cabling, to a respective port on the array 160.

The array 160 is shown to include four front-end directors 170(1)-170(4). Each front-end director has two ports, providing the array 160 with a total of eight ports 172(1)-172(8). Each of the ports 172(1)-172(8) is connected to a respective one of the output ports 154(1)-154(8) on the SAN 150 (e.g., using cabling). A pair of array buses, 180(1) and 180(2), are provided within the array 160. In a manner that mirrors the structure of the host 110, the front-end directors 170(1)-170(4) are generally provided as circuit board assemblies that plug into the buses 180(1)-180(2), which may be provided in the form of PCI buses or any of the types of buses described above in connection with the host 110. The array 160 includes a cache 184, typically for both reading and writing, and further includes storage media 190, such as one or more disk drives, solid state drives or other types of non-volatile media. The storage media 190 are provided in the form of one or more volumes (e.g., volumes 192(1) and 192(2)). The volumes 192(1) and 192(2) may be physical and/or logical. In an example, volumes are provided in the form of multiple logical storage units (LUNs). It is understood that different arrays have different architectures, and that the techniques hereof are applicable to any type of array.

The host 110 can transmit IO requests to the array 160 via multiple paths. A "path" is defined as the topological course an IO request can take from the MP driver 126 to a particular volume 192(1)-192(2) on the storage media 190 of the array 160. In the example shown, IO requests from the MP driver 126 can branch down two different pathways, to each of the buses 130(1)-130(2). From each bus, IO requests can further branch down two pathways (e.g., to two HBAs each), for a total of four pathways. From each of the HBAs 140(1)-140(4), IO requests can branch to two different ports, for a total of eight ports 142(1)-142(8). Pathways are then multiplied by the SAN 150, where each of the input ports 152(1)-152(8) can be switched to any of the output ports 154(1)-154(8). Within the array 160 as illustrated, however, each front-end director port 172(1)-172(8) can follow only a single course to the storage media 190. Thus, the total number of unique paths in the example shown is 64.

It is understood that the total number of paths depends on the particular architecture of the host 110, the SAN 150, the array 160, and the cabling among them. For example, the host 110 may include greater or lesser numbers of buses, HBAs, and ports. The SAN 150 may include greater or lesser numbers of input ports, greater or lesser numbers of output ports, may employ more constrained switching, or may employ zoning to limit available switching arrangements. Also, the array 160 may include multiple back-end directors (not shown), multiple ports from the back-end directors to the storage volume(s), and/or multiple caches (not shown), such that multiple pathways may be followed from each front end director port 172(1)-172(8) to each storage volume 192(1)-192(2). The example shown is thus merely illustrative.

Although the topology of the electronic system 100 may vary, it is evident that any topology includes multiple layers of hardware components. In most cases, the layers are arranged in one or more hierarchies. In the example shown, the host 110 includes at least three layers of hardware components, which extend from the MP driver 126—buses 130(1)-130(2), HBAs 140(1)-140(4), and ports 142(1)-142(8). These hardware layers form a hierarchy, wherein each bus maps to multiple HBAs and each HBA maps to multiple ports. The hierarchy is indicated by the illustrated tree structure formed by the buses 130(1-2), HBAs 140(1-4), and ports 142(1-8).

Likewise, the array 160 includes at least three layers of hardware components that converge on the cache 184—array buses 180(1)-180(2), front-end adapters 170(1)-170(4), and ports 172(1)-172(8). These hardware layers form a second hierarchy, wherein each bus maps to multiple front-end adapters and each front-end adapter maps to multiple ports. The second hierarchy is indicated by the illustrated tree structure formed by the buses 180(1)-180(2), front-end adapters 170(1)-170(4), and ports 172(1)-172(8). An additional hierarchy (not shown) may be formed within the array 160, such as where the array 160 includes multiple back-end directors, each having ports, which connect to respective storage volumes.

In addition, the SAN 150 has at least two layers of hardware components, input ports 152(1)-152(8) and output ports 154(1)-154(2). Depending on the architecture of the SAN 150, additional layers of hardware components may be provided internally, and such layers may form their own hierarchy (not shown).

In an example, the configuration record 128 stores a list of all possible paths. The configuration record 128 associates each path with a particular hardware component at each of multiple layers of the electronic system 100. For example, for a particular path, the configuration record 128 identifies an associated host bus (e.g., one of the buses 130(1)-130(2)), an associated HBA (e.g., one of the HBAs 140(1)-140(4)), and an associated HBA port (e.g., one of ports 142(1)-142(8)). In a similar manner, the configuration record 128 identifies for the path an associated input port of the SAN 150, an associated output port of the SAN 150, an associated input port of the front end directors (e.g., one of 172(1)-172(8)), an associated front-end director (e.g., one of 170(1)-170(2)), and an associated array bus (e.g., one of 180(1)-180(2)).

In operation, the host 110 runs the application program 122, which issues IO requests to read from and/or write to a designated volume on the array 160. The IO requests travel down an IO stack of the host 110 and encounter the MP driver 126. The MP driver 126 chooses a first path for transmitting the IO request to the designated volume on the array 160. In the example shown, the MP driver 126 selects the path 146 as the first path, which FIG. 1 illustrates in the form of a heavy, dark line.

The IO request either succeeds or fails down the first path 146. If the operation specified by the IO request is performed without errors, the IO request succeeds. However, if the operation specified by the IO request times out or produces one or more errors, the IO request fails and the MP driver 126 is informed of the failure.

The MP driver 126 then selects a second path for retrying the IO request. Rather than selecting the second path at random or as simply a next path on a list of paths, the MP driver 126 examines the configuration record 128 and selects the second path as a path that the configuration record 128 indicates is different from the first path 146 at multiple hardware layers. For example, the MP driver 126 may select the second path as one which traverses a different HBA port (one of 142(1)-142(8)) and a different front-end director port (one of 172(1-172(8)) from those of the first path. Alternatively, the MP driver 126 may select the second path as one that traverses a different host bus (one or 130(1)-130(2)) and a different front-end director (one of 170(1)-170(4)) than those traversed by the first path 146.

In an example, the MP driver 126 selects the second path to be maximally different from the first path 146, i.e., to involve the use of different hardware components at the greatest possible number of hardware layers of the electronic system 100. In this manner, the second path is selected to include hardware components that are as distinct as possible from those of the first path 146. In the example shown, the second path is selected as the path 148 (shown using a thick, gray line).

The MP driver 126 retries the IO request down the second path 148. If the IO succeeds, the first path 146 may be indicted as faulty or suspect (i.e., identified as a genuinely failing path). If the IO request down the second path 148 fails, however, the request is identified with a high degree of certainty as being bogus.

The rationale behind selecting the second path 148 as a path that traverses maximally different hardware from that traversed by the first path 146 is to rule out hardware as the cause of the IO failure. If the IO request fails down the first path 146 because of malfunction in a hardware component at any of the hardware layers traversed by the first path 146, selecting the second path 148 with distinct hardware ensures that the malfunctioning hardware will not be part of the second path 148 and thus will not be the cause of any subsequent IO failure of the same IO request. Any subsequent failure of the request down the second path 148 will thus have to have been caused by something other than the same hardware continuing to malfunction. Our experience has shown that IO request failures down paths that use distinct hardware almost certainly indicate bogus IOs.

The task of the MP driver 126 in selecting the second path can be simplified by taking into account the inherent hierarchy (or hierarchies) of the different layers of hardware components. For example, with the arrangement of FIG. 1, maximally different hardware can be selected by selecting for the second path 148 a hardware component at the highest level of each of the illustrated hierarchies (for which different hardware components are available) that is different from the hardware components selected for the first path 146 for that same level. Thus, by selecting a different host bus (one of 130(1)-130(2)) and by selecting a different array bus (180(1)-180(2)), it is assured that the hardware components at every level subordinate to host buses and array buses will also be different from those selected for the first path 146 and that the resulting hardware components of the second path 148 will be maximally different from those of the first path 146.

As shown and described, the improved technique can identify bogus IOs with a high degree of certainty by retrying a failing IO request down a single, additional path. Delays associated with retying the IO request down further paths are therefore avoided. The MP driver 126 thus quickly and efficiently diagnoses bogus IOs, avoiding unpredictable and substantial delays in running the application program 122 and promoting consistent, reliable performance.

Figure 2:
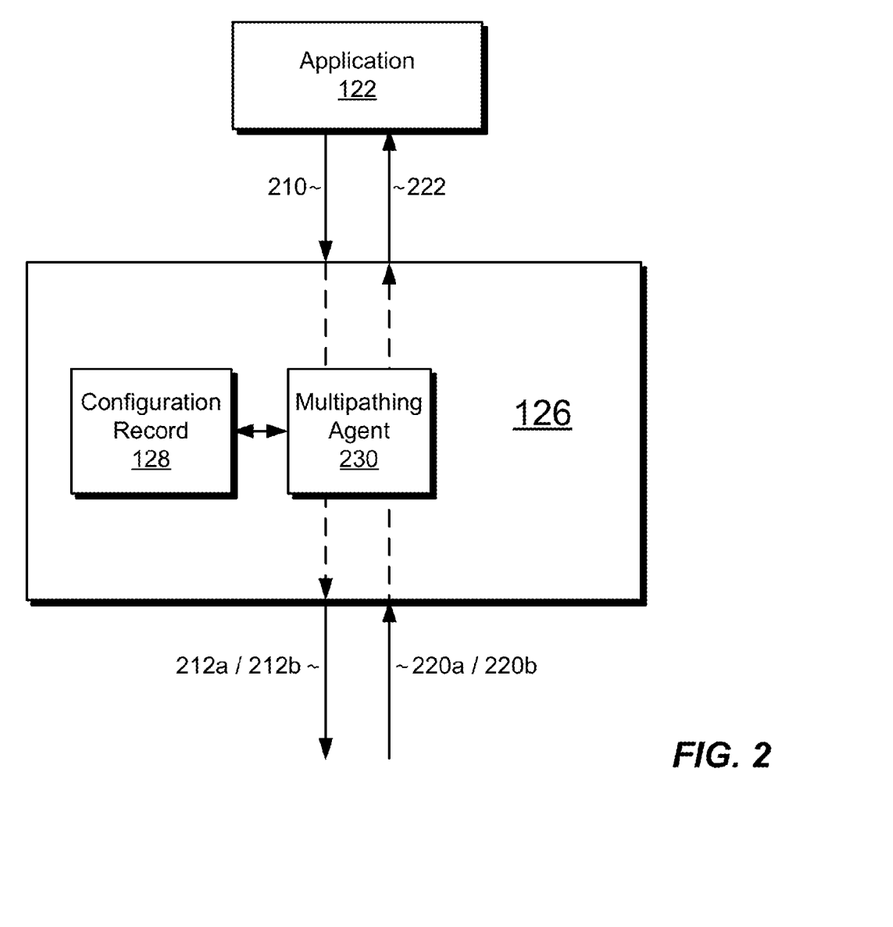
FIG. 2 is a block diagram showing an example application program and multipathing driver that run on the host computing device of FIG. 1, wherein the multipathing driver includes a configuration record.

FIG. 2 shows additional example aspects of the application program 122 and MP driver 126 of FIG. 1. Here, the MP driver 126 is seen to include a multipathing (MP) agent 230 in addition to the configuration record 128.

In operation, the application program 122, in the course of running on the host 110, issues an IO request 210. The IO request 210 is typically a read request, a write request, or a control IO. The IO request 210 is passed down the IO stack (not shown) of the host 110 until it reaches the MP driver 126. The MP agent 230 receives the IO request 210 and assigns a path for the IO request 210. The MP agent 230 updates the IO request 210 with the assigned path information, to form an updated IO request 212a. The updated IO request 212a then propagates through the selected path to the storage media 190 on the array 160, traversing various hardware components at various hardware layers along its way. Once the updated IO request 212a arrives at the storage media 190 on the array 160, the array 160 attempts to complete the read, write, or control operation, as specified by the updated IO request 212a.

In response to receiving and processing the updated IO request 212a, the array 160 typically generates an IO response 220a. The IO response 220a is sent back to the MP driver 126 using the same path that was selected for conveying the updated IO request 212a. The IO response 220a indicates whether the updated IO request 212a succeeded or failed. The IO response 220a may include additional information, as well. For example, where the updated IO request 212 is a write request, the IO response 220 may include a write confirmation. Where the updated IO request 212 is a read request, the IO response 220 may include the data actually read from the array 160, or a location (e.g., a cache on the host 110) where the requested data may be obtained. Where the IO request is a control IO, the IO response 220 may include a variety of settings or performance information, as appropriate for the particular control IO.

The MP agent 230 receives the IO response 220a and tests whether the updated IO request 212a succeeded or failed. If the IO response 220a indicates that the updated IO request 212a succeeded, the MP agent 230 forwards the IO response 220a to the application program 122, i.e., in the form of IO response 222, which may be an updated version of the IO response 220a. However, if the IO response 220a indicates that the updated IO request 212a failed, the MP agent 230 marks the first path as suspect and retries the IO request 210 down a different path.

In some instances, no IO response 220a may be received from the array 160. For example, a cable may be loose or disconnected or the storage media 190 may temporarily be in an unresponsive state where it is not yet ready to process IO requests. To prevent the MP agent 230 from waiting for the IO response 220a indefinitely, the updated IO request 220a is typically dispatched to the array 160 with a designated timeout. If the timeout expires and no IO response 220a has been received, a failure message is generated. The MP agent 230 receives the failure message and proceeds to select a different path for the IO request.

To select the different path, the MP agent 230 accesses the configuration record 128 and identifies within the configuration record 128 a second path that traverses hardware that is different from the hardware traversed by the initial (first) path at multiple hardware layers. In an example, the MP agent 230 selects the second path as one that is maximally different from the first path, e.g., a path that is different at every hardware layer where it is possible to select different hardware components.

Having identified a suitable second path, the MP agent 230 retries the IO request 210 by dispatching an updated IO request 212b to the storage media 190 on the array 160 down the second path. In response to the request 212b, the array 160 generates a new IO response 220b. The MP agent 230 receives the IO response 220b and reads the IO response 220b to determine whether the updated IO request 212b dispatched down the second path succeeded or failed (or concludes that the updated IO request 212b failed if no IO response 220b is received when the timeout expires).

If the IO response 220b indicates that the updated IO request 212b succeeded, the MP agent 230 forwards the IO response 220b to the application program 122 in the form of response 222, which may be an updated version of the IO response 220b. The application program 122 then proceeds in the normal manner. However, if the IO response 220b indicates that the updated IO request 212b failed, even down the second path where distinct hardware was used at multiple layers, the MP agent 130 identifies the IO request 210 as bogus. The IO response 220b is forwarded to the application program 122, which interprets the failing IO request 210 in accordance with its own programming and error trapping. The MP agent 230 typically does not attempt the IO request 210 down any additional paths. Time is saved by avoiding needless retries of the IO request 210 down all available paths.

Figure 3:
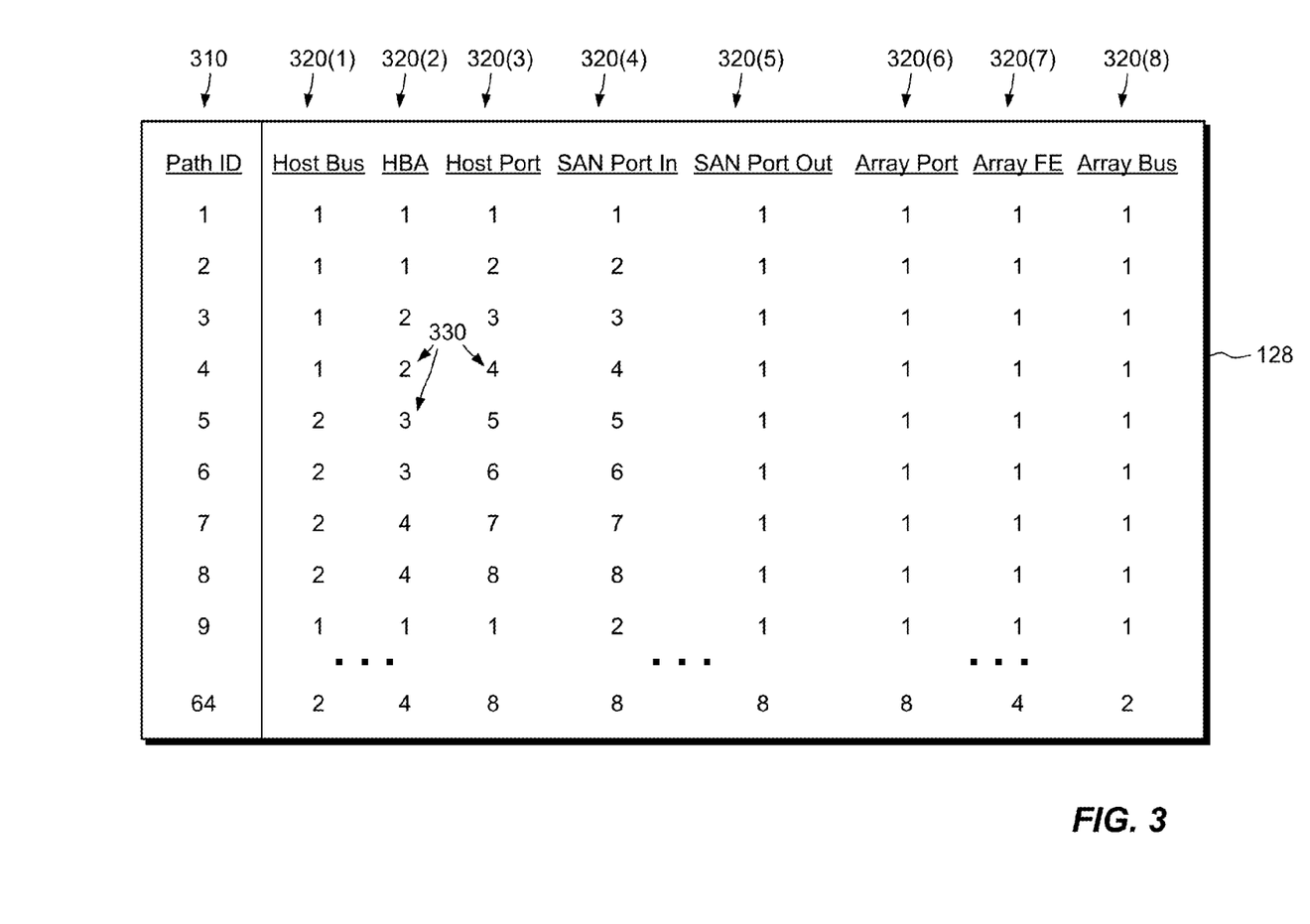
FIG. 3 is a tabular representation of an example configuration record as shown in FIG. 2.

FIG. 3 shows an example representation of the configuration record 128. Here, all 64 paths supported by the electronic system 100 are listed in tabular form according to their path ID 310 (e.g., path number). Each value of path ID 310 is associated with a particular hardware component in each of multiple hardware layers 320(1)-320(8) as indicated. Here, the designated hardware layers include Host Bus 320(1), HBA 320(2), Host Port 320(3), SAN Port In 320(4), SAN Port Out 320(5), Array Port 320(6), Array Front-End Director 320(7), and Array Bus 320(8).

The configuration record 128 includes, for each path 310 and each of the hardware layers 320(1)-320(8), an identifier 330 of the particular hardware component traversed by the respective path at the respective hardware layer. Here, each particular hardware component is indicated with an index that matches the index used in FIG. 1. Thus, for example, the "1" under Host Bus 320(1) for path "1" indicates the host bus 130(1) of FIG. 1 and the "3" under HBA 320(2) for path "5" indicates the HBA 140(3) of FIG. 1.

In operation, the MP agent 230 selects a first path, tries an IO request, and, if the request fails, accesses the configuration record 128 to select a second path. The second path is selected such that the hardware components, as indicated by the indicators 330, are different from those listed in the configuration record 128 for the first path across multiple hardware layers 320(1)-320(8). In an example, the second path is selected so that the hardware components, as indicated by the indicators 330, are different across all hardware layers 320(1)-320(8) or a maximum possible number of them. Selection of the second path can be performed simply and efficiently by recognizing that the hierarchy (or hierarchies) of hardware components of the electronic system 100 indicate separation of hardware components at a high level. For instance, if the first path used the host bus 130(1) (the highest level of the hierarchy of hardware components on the host 110 from which different hardware components can be selected), the second path may be required to use host bus 130(2). Any arbitrary choice can then be made for HBA and HBA Port under the host bus 130(2), as any choice will be associated with different hardware components that those involved in the first path. Similarly, if the first path traversed array bus 180(1) (the highest level of the hierarchy of hardware components on the array 160 from which different hardware components can be selected), the second path may be required to use a different array bus, i.e., bus 180(2). The choice of a particular front-end director and front-end director port will then be entirely arbitrary, as any front-end director and front-end director port falling under the array bus 180(2) will be different from those of the first path.

It is evident that the number of possible paths 310 and the number and nature of the hardware layers 320(1)-320(8) represented in the configuration record 128 will vary depending on the particular architecture of the electronic system 100. Also, it is evident that certain architectures will force certain dependencies in hardware components selected. For instance, the electronic system 100 requires a one-to-one mapping of HBA ports 142(1)-142(8) to respective SAN input ports 152(1)-152(8). One cannot, therefore, independently select an HBA port and a SAN input port. Selecting one implies the other. For similar reasons, there is a one-to-one mapping between SAN output ports 154(1)-154(8) and front-end director input ports 172(1)-172(8).

Because of these dependencies, an alternative form of the configuration record 128 can be realized, which is limited to hardware layers whose hardware component values are not completely constrained by hardware component values in other hardware layers. For example, it is possible, without sacrificing functionality, to omit the hardware layers for Host Port 320(3) and Array Port 320(6), as the hardware components listed under these layers will always be the same as those selected for the SAN Port In 320(4) and SAN Port Out 320(5), respectively. It is envisioned that other architectures will also include completely constrained hardware layers, and such hardware layers may be safely omitted from the configuration records 128 used in connection with those architectures.

The configuration record 128 can be realized in a variety of forms. In one example, the configuration record 128 is realized as a file, which is updated every time the relevant configuration of the electronic system 100 changes. The contents of the file can be read into the memory 120 during runtime, for quick access by the MP agent 230. In another example, a system discovery process is run at power-up or during an initialization of the electronic system 100 and the configuration record 128 is maintained exclusively in memory, i.e., in a data structure such as a data array. According to one variant, the configuration record 128 is realized as a data structure having tree-like sections, where nodes reflect the hardware layers 320(1)-320(8) and the hierarchical arrangements of hardware components among them, such that the data structure mirrors the structure of hardware components within the electronic system 100. Particular paths can then be identified as unique pathways between nodes of the data structure.

Figure 4:
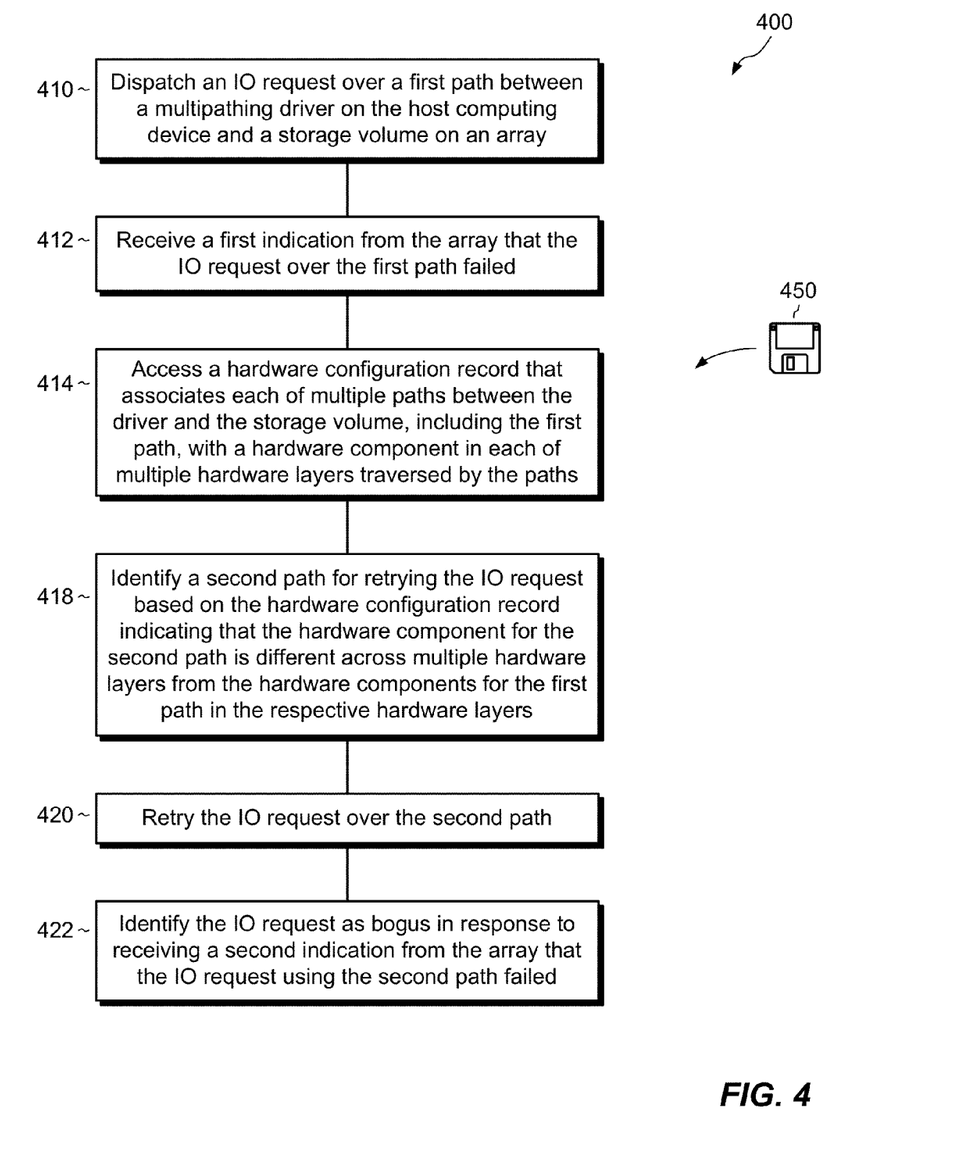
FIG. 4 is a flowchart showing an example process for handling IO requests so as to identify bogus IOs.

FIG. 4 illustrates an example process 400 for processing IO requests. The process 400 may be carried out in connection with the host 110 and is typically performed by the constructs, described in connection with FIGS. 1 and 2, which reside in the memory 120 of the host 110 and are run by the set of processors 112. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, an IO request (e.g., 210) is dispatched, e.g., by the MP driver 126 on the host 110 via the updated IO request 212a, over a first path between the MP driver 126 and a storage volume (e.g., 192(1) or 193=2(2)) on the array 160. The IO request 210 typically originates from the application program 112.

At step 412, a first indication is received from the array 160 that the IO request over the first path failed. In one example, an 10 response 220a is received, which indicates that the IO request dispatched over the first path has failed. In another example, no IO response 220a is received during a designated interval, and a resulting timeout is interpreted as an IO request failure.

At step 414, the hardware configuration record 128 is accessed, e.g., by the MP agent 230. The hardware configuration record 128 associates each of multiple paths between the MP driver 126 and the storage volume, including the first path, with a hardware component (e.g., as indicated by indicators 330) in each of multiple hardware layers (e.g., layers 320(1)-320(8)) traversed by the paths.

At step 418, a second path is identified for retrying the IO request based on the hardware configuration record 128 indicating that the hardware component for the second path is different across multiple hardware layers (e.g., layers 320(1)-320(8)) from the hardware components for the first path in the respective layers. Identification of the second path can be facilitated by applying the fact that hardware components are arranged in one or more hierarchies, and that selecting different hardware components at higher levels of hierarchy/hierarchies makes selections of hardware components at lower levels of the hierarchy/hierarchies arbitrary.

At step 420, the IO request is retried over the identified second path. For example, the MP agent 230 creates a new updated IO request 212b and dispatches the IO request 212b down the second path.

At step 422, the IO request 210 is identified as bogus in response to receiving an indication from the array 160 (a second indication) that the IO request 210 using the second path failed. For example, if the IO response 220b indicates a failure or times out, the MP agent 230 concludes that the IO request 210 is bogus.

The process 400 can be supplemented with additional functionality in numerous ways. For example, after receiving the first indication from the array 160 that the IO request over the first path has failed but before retrying the IO request down the second path, the MP driver 126 may perform a connection test. In an example, the connection test entails the MP driver 126 attempting to exchange messages with the volume on the array 160 designated by the IO request 210 over the first path. If messages are exchanged successfully, it can be concluded that there are no hardware problems along the first path or that any hardware problems that had been present are intermittent. However, if the connection test fails, a genuine path failure may be indicated.

If the connection test passes, i.e., confirms that messages can be exchanged with the designated volume on the array 160 over the first path, the MP driver 126 may retry the IO request down the first path (prior to retrying the IO request down the second path). If the IO request fails down the first path a second time, despite the connection test passing, the MP driver 126 may mark the IO request as suspect of being a bogus IO.

If the IO request down the first path fails a second time, the MP driver 126 may run the connection test on the first path once again. If the connection test again passes, the MP driver may mark the IO request as being strongly suspect of being a bogus IO, as the failing IO request will have been surrounded in time by two passing connection tests. The chances of the IO request failing on account of an intermittent hardware problem are thus reduced to a very low level, as connections are confirmed both immediately before and immediately after the failing IO. In this example, sending the IO request down a second path and observing a failure confirms what is already strongly suspected—that the request is a bogus IO.

An improved technique for processing IO requests has been described that distinguishes bogus IOs from genuine IO request failures by accessing a hardware configuration record 128 that associates available paths with hardware components at different hardware layers 320(1)-320(8) traversed by the paths. When an IO request fails down a first path, a second path is selected for retrying the IO request by accessing the hardware configuration record 128 and identifying a path that the record 128 indicates traverses hardware components that are different from those traversed by the first path at multiple hardware layers. The chance that an IO request will fail due to faulty hardware over both the first path and the second path is thus low, such that IO failures down both the first path and the second path provide a clear indication that the IO request is bogus.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although certain embodiments have been described wherein the second path is selected to traverse hardware components that are maximally different from those traversed by the first path, this is not required. In some implementations, for example, certain paths are designated as "active" paths whereas others are designated as "passive" paths. Active paths are those which are immediately ready for use, whereas passive paths require time-consuming reconfiguration of SAN and/or array resources. In such implementations, it is generally preferable to select the second path to be an active path, even if doing so retains some hardware commonality between the first and second paths.

Also, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on the controller 114, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of processing IO requests, comprising:
    dispatching an IO request over a first path between a multipathing driver on a host and a storage volume on an array;
    receiving a first indication from the array that the IO request over the first path failed;
    accessing a hardware configuration record that associates each of multiple paths between the driver and the storage volume, including the first path, with a hardware component in each of multiple hardware layers traversed by the paths;
    identifying a second path for retrying the IO request based on the hardware configuration record indicating that the hardware components for the second path are different across multiple hardware layers from the hardware components for the first path in the respective hardware layers;
    retrying the IO request over the second path; and
    identifying the IO request as bogus in response to receiving a second indication from the array that the IO request using the second path failed.

2. The method of claim 1, wherein identifying the second path for retrying the IO request is based on the hardware configuration record indicating that the hardware component for the second path is different in each of the hardware layers from the hardware component for the first path in each respective hardware layer.

3. The method of claim 1, wherein a set of hardware components represented in the configuration record are arranged in a hierarchy, wherein the hardware component at each level of the hierarchy, except the lowest level, maps to multiple hardware components at a lower level of the hierarchy, and wherein identifying the second path for retrying the IO request includes identifying a path, from the configuration record, that traverses a hardware component at a highest level of the hierarchy that is different from the hardware component traversed by the first path at the same level of the hierarchy.

4. The method of claim 3, wherein host buses form a first level of the hierarchy, host bus adapters form a second level of the hierarchy, and host ports form a third level of the hierarchy, wherein each host bus maps to multiple host bus adapters and each host bus adapter maps to multiple host ports, and wherein identifying the second path for retrying the IO request involves selecting a path that traverses a different host bus from the one traversed by the first path.

5. The method of claim 3, wherein another set of hardware components represented in the configuration record are arranged in a second hierarchy, wherein the hardware component at each level of the second hierarchy, except the lowest level, maps to multiple hardware components at a lower level of the second hierarchy, and wherein identifying the second path for retrying the IO request includes identifying a path, from the configuration record, that traverses a hardware component at a highest level of the second hierarchy that is different from the hardware component traversed by the first path at the same level of the second hierarchy.

6. The method of claim 5, wherein array buses form a first level of the second hierarchy, front end directors form a second level of the second hierarchy, and array ports form a third level of the second hierarchy, wherein each array bus maps to multiple front end directors and each front end director maps to multiple array ports, and wherein identifying the second path for retrying the IO request involves selecting a path that traverses a different array bus from the one traversed by the first path.

7. The method of claim 1, wherein a set of hardware components represented in the configuration record are arranged in a hierarchy, wherein the hardware component at each level of the hierarchy, except the lowest level, maps to multiple hardware components at a lower level of the hierarchy, and wherein identifying the second path for retrying the IO request includes identifying a path, from the configuration record, that traverses a hardware component at a highest level of the hierarchy that is different from the hardware component traversed by the first path at the same level of the hierarchy.

8. The method of claim 7, wherein array buses form a first level of the hierarchy, front end directors form a second level of the hierarchy, and array ports form a third level of the hierarchy, wherein each array bus maps to multiple front end directors and each front end director maps to multiple array ports, and wherein identifying the second path for retrying the IO request involves selecting a path that traverses a different array bus from the one traversed by the first path.

9. The method of claim 1, wherein identifying the IO as bogus is conducted based on receiving indications of IO failures for the first path and the second path only.

10. The method of claim 1, further comprising, prior to retrying the IO request using the second path, running a connection test on the first path to determine whether connectivity between the host and the storage volume on an array can be confirmed.

11. The method of claim 10, further comprising, in response to the connection test confirming connectivity between the host and the storage volume on an array and prior to retrying the IO request using the second path, retrying the IO request using the first path.

12. The method of claim 11, further comprising, in response to receiving an indication of an IO failure when retrying the IO request using the first path and prior to retrying the IO request using the second path, rerunning the connection test on the first path to determine again whether connectivity between the host and the storage volume on an array can be confirmed.

13. The method of claim 1, wherein the first path traverses a first input port of a storage area network (SAN) and a first output port of the SAN, and wherein the second path traverses a second input port of the SAN and a second output port of the SAN.

14. A host computing device for processing IO requests, comprising:
   a set of processors; and
   memory, coupled to the set of processors, the memory constructed and arranged to store instructions executable by the set of processors,
   wherein the set of processors executing instructions from the memory forms a controller constructed and arranged to:
      dispatch an IO request over a first path between a multipathing driver on the host computing device and a storage volume on an array;
      receive a first indication from the array that the IO request over the first path failed;
      access a hardware configuration record that associates each of multiple paths between the driver and the storage volume, including the first path, with a hardware component in each of multiple hardware layers traversed by the paths;
      identify a second path for retrying the IO request based on the hardware configuration record indicating that the hardware components for the second path are different across multiple hardware layers from the hardware components for the first path in the respective hardware layers;
      retry the IO request over the second path; and
      identify the IO request as bogus in response to receiving a second indication from the array that the IO request using the second path failed.

15. The host computing device of claim 14, wherein the controller, when constructed and arranged to identify the second path for retrying the IO request, is constructed and arranged to identify the second path based on the hardware configuration record indicating that the hardware component for the second path in each of the hardware layers is different from the hardware component for the first path in each respective hardware layer.

16. The host computing device of claim 14, wherein a set of hardware components represented in the configuration record are arranged in a hierarchy, wherein the hardware component at each level of the hierarchy, except the lowest level, maps to multiple hardware components at a lower level of the hierarchy, and wherein, when constructed and arranged to identify the second path for retrying the IO request, the controller is further constructed and arranged to identify a path, from the configuration record, that traverses a hardware component at a highest level of the hierarchy that is different from the hardware component traversed by the first path at the same level of the hierarchy.

17. The host computing device of claim 16, wherein another set of hardware components represented in the configuration record are arranged in a second hierarchy, wherein the hardware component at each level of the second hierarchy, except the lowest level, maps to multiple hardware components at a lower level of the second hierarchy, and wherein, when constructed and arranged to identify the second path for retrying the IO request, the controller is further constructed and arranged to identify a path, from the configuration record, that traverses a hardware component at a highest level of the second hierarchy that is different from the hardware component traversed by the first path at the same level of the second hierarchy.

18. A non-transitory computer readable medium including instructions which, when executed by a set of processors of a host computing device, cause the set of processors to perform a method of processing IO requests, the method comprising:
   dispatching an IO request over a first path between a multipathing driver on a host and a storage volume on an array;
   receiving a first indication from the array that the IO request over the first path failed;
   accessing a hardware configuration record that associates each of multiple paths between the driver and the storage volume, including the first path, with a hardware component in each of multiple hardware layers traversed by the paths;
   identifying a second path for retrying the IO request based on the hardware configuration record indicating that the hardware components for the second path are different across multiple hardware layers from the hardware components for the first path in the respective hardware layers;
   retrying the IO request over the second path; and
   identifying the IO request as bogus in response to receiving a second indication from the array that the IO request using the second path failed.

19. The non-transitory computer readable medium of claim 1, wherein the method further comprises, prior to retrying the IO request using the second path, running a connection test on the first path to determine whether connectivity between the host and the storage volume on the array can be confirmed.

20. The non-transitory computer readable medium of claim 19, further comprising, in response to the connection test confirming connectivity between the host and the storage volume on the array and prior to retrying the IO request using the second path:
   retrying the IO request using the first path; and
   in response to an IO failure when retrying the IO request using the first path and prior to retrying the IO request using the second path, rerunning the connection test on the first path to determine again whether connectivity between the host and the storage volume on the array can be confirmed.

* * * * *